United States Patent
Takaishi et al.

[11] Patent Number: 6,084,742
[45] Date of Patent: Jul. 4, 2000

[54] DRIVE CONTROL APPARATUS FOR A DISK DRIVE

[75] Inventors: Kazuhiko Takaishi; Kunihiro Shimada, both of Kawasaki, Japan

[73] Assignee: Fujitsu Limited, Kawasaki, Japan

[21] Appl. No.: 08/858,151

[22] Filed: Mar. 28, 1997

Related U.S. Application Data

[63] Continuation-in-part of application No. 08/407,182, Mar. 21, 1995, abandoned.

[30] Foreign Application Priority Data

Apr. 6, 1994 [JP] Japan .................................. 6-068588

[51] Int. Cl.[7] .................................................. G11B 5/596
[52] U.S. Cl. .................................... 360/78.06; 360/78.04; 360/78.07; 360/78.09
[58] Field of Search ............................ 360/78.04, 78.05, 360/78.06, 78.07, 78.08, 73.11, 78.09, 73.03, 97.01; 364/150, 200, 474.3; 395/275, 425, 250; 318/599, 270, 561; 369/44.28, 50; 711/165

[56] References Cited

U.S. PATENT DOCUMENTS

| | | | |
|---|---|---|---|
| 4,344,132 | 8/1982 | Dixon et al. ............................ | 364/200 |
| 4,477,750 | 10/1984 | Collins et al. ......................... | 318/270 |
| 4,480,279 | 10/1984 | Hashimoto ............................. | 360/78 |
| 4,486,797 | 12/1984 | Workman . | |
| 4,656,538 | 4/1987 | Mattson ................................. | 360/77 |
| 4,843,288 | 6/1989 | Volz et al. ............................. | 318/599 |
| 4,931,924 | 6/1990 | Kageura ................................. | 364/200 |
| 5,025,330 | 6/1991 | Nishimiya ............................ | 360/78.04 |
| 5,063,549 | 11/1991 | Yamamuro ............................ | 369/44.28 |
| 5,087,994 | 2/1992 | Fukushima .......................... | 360/73.03 |
| 5,109,502 | 4/1992 | Sasamoto et al. .................... | 395/425 |
| 5,151,639 | 9/1992 | Hasegawa . | |
| 5,229,896 | 7/1993 | Tohyama et al. .................... | 360/78.07 |
| 5,261,058 | 11/1993 | Squires et al. ........................ | 395/275 |
| 5,285,330 | 2/1994 | Masaki ................................. | 360/77.08 |
| 5,289,097 | 2/1994 | Erickson et al. ...................... | 318/561 |
| 5,345,348 | 9/1994 | Suzuki ................................. | 360/78.07 |
| 5,383,068 | 1/1995 | Shimuzu et al. ..................... | 360/78.06 |
| 5,392,176 | 2/1995 | Anderson ............................. | 360/97.01 |
| 5,404,308 | 4/1995 | Kajiyama ............................. | 364/474.3 |
| 5,465,183 | 11/1995 | Hattori ................................. | 360/78.9 |
| 5,475,545 | 12/1995 | Hampshire et al. . | |
| 5,513,326 | 4/1996 | Nute ..................................... | 395/250 |
| 5,589,996 | 12/1996 | Patrick et al. ........................ | 360/73.03 |
| 5,637,970 | 6/1997 | Kisaka et al. ........................ | 318/561 |
| 5,663,845 | 9/1997 | Yamamoto et al. ................. | 360/73.11 |
| 5,737,762 | 4/1998 | Hattori ................................. | 711/165 |
| 5,754,358 | 5/1998 | Yatsu ................................... | 360/78.09 |
| 5,870,363 | 2/1999 | Sun et al. ............................. | 369/50 |
| 5,880,953 | 3/1999 | Takeuchi et al. .................... | 364/150 |
| 5,936,792 | 8/1999 | Kobayashi et al. ................. | 360/78.07 |

FOREIGN PATENT DOCUMENTS

| | | | |
|---|---|---|---|
| 356 939 | 3/1990 | European Pat. Off. ............ | 360/78.07 |
| 356939 | 3/1990 | European Pat. Off. . | |
| 357044 | 3/1990 | European Pat. Off. . | |

(List continued on next page.)

*Primary Examiner*—Frank J. Asta
*Assistant Examiner*—Thong Vu
*Attorney, Agent, or Firm*—Greer, Burns & Crain, Ltd.

[57] ABSTRACT

A processing unit for effecting speed control in a drive control apparatus includes a storing unit having a first table which stores discrete values having exponential intervals, and a second table which stores multiples of normalized reference values having uniform intervals from each other and relating to a distance between a driven body subject to the speed control and a target position. The discrete values lie in a range over which the normalized reference values vary and are bound in a predetermined relation to a coefficient multiplied by the normalized reference values. The normalized reference values lie in the upper ½ range of said discrete values.

A control target value generating unit calculates a control target value relating to a target speed of the driven body, by referring to the first and second tables.

3 Claims, 11 Drawing Sheets

FOREIGN PATENT DOCUMENTS

| | | |
|---|---|---|
| 61-28135 | 2/1986 | Japan . |
| 61-28136 | 2/1986 | Japan . |
| 2-73578 | 3/1990 | Japan . |
| 2-134775 | 5/1990 | Japan . |
| 3-80476 | 4/1991 | Japan . |
| 4-111268 | 4/1992 | Japan . |
| 4-167009 | 6/1992 | Japan . |
| 4-358370 | 12/1992 | Japan . |
| 5-89614 | 4/1993 | Japan . |
| 5-94680 | 4/1993 | Japan . |

FIG. 4B

| X | $X/X_0$ | N | $2^N X/X_0$ |
|---|---------|---|-------------|
| 0.2 | 0.2/256 | 10 | 0.8 |
| 0.5 | 0.5/256 | 9 | 1.0 |
| 1.0 | 1.0/256 | 8 | 1.0 |
| 2.0 | 2.0/256 | 7 | 1.0 |
| 3.2 | 3.2/256 | 6 | 0.8 |
| 4 | 4/256 | 6 | 1.0 |
| 8 | 8/256 | 5 | 1.0 |
| 32 | 32/256 | 3 | 1.0 |
| 128 | 128/256 | 1 | 1.0 |
| 256 | 256/256 | 0 | 1.0 |

N IS AN INTEGER SELECTED DEPENDING ON THE VALUE OF $X/X_0$

| $1/2^N$ | $(1/2^N)^P$ | N |
|---|---|---|
| $1/2^4$ | $(1/2^4)^P$ | 4 |
| $1/2$ | $(1/2)^P$ | 1 |
| 1 | 1 | 0 |

| $2^N X/X_0$ | $(2^N X/X_0)^P$ |
|---|---|
| 0.5 | $0.5^P$ |
| 1 | 1 |

DRIVE CONTROL APPARATUS FOR A DISK DRIVE

This application is a continuation-in-part of application Ser. No. 08/407,182, filed Mar. 21, 1995, now abandoned.

BACKGROUND OF THE INVENTION

1. Field of the Invention

The present invention relates to a drive control apparatus for moving a body to a target position at a predetermined speed, and, more particularly, but not by way of limitation to an improved drive control apparatus for use in a disk drive.

Recently, with magnetic disk drives and magneto-optical disk drives becoming more and more compact, the size of a circuit board of a drive control apparatus for moving a head to a predetermined position has been reduced. Consequently, an allowable surface area on which components of a control circuit are mounted has become reduced.

Accordingly, it is required to perform control with higher precision by reducing the capacity of a memory that is built in a microcontroller (MCU).

2. Prior Art

Conventionally, a drive control apparatus is used, for example, to control the driving of a head in a magnetic disk drive.

FIG. 1 is a plan view of an example of a conventional magnetic disk drive. In a magnetic disk drive 11 shown in FIG. 1, an actuator 12 has an arm 13. A support spring mechanism 13a at the end of the arm 13 has a magnetic head 14 mounted at its end.

The base of the arm 13 is rotatably supported by a pivot 15.

A rotatably supporting part 16 is formed at the other end of the arm 13, the pivot 15 being disposed between the arm 13 and the rotatably supporting part 16. A coil 17 is wound around the rotatably supporting part 16. Two magnets 18a and 18b are fixed below the coil 17. The coil 17, and the magnets 18a and 18b constitute a voice coil motor (VCM).

The actuator 12 is constituted such that the arm 13 is rotated so as to move the magnetic head 14 in a radial direction with respect to a magnetic disk 20 fixed on a spindle 19 of a spindle motor (not shown) of a sensorless type and rotated thereby. The rotation of the arm 13 is effected by energizing the coil 17 via a flexible printed board 22 on a circuit board 21. The magnetic head 14 is made to float due to an air flow caused by the rotation of the magnetic disk 20.

A control base board (not shown) is fitted to the magnetic disk drive 11. The control base board mainly comprises a central processing unit (CPU), a microcontroller (MCU), a read/write control unit, a head position control unit and a spindle motor control unit.

The magnetic disk 20 is formed such that magnetic medium is made to spread on the surface of a glass or aluminum disk. Alternatively, sputtering may be employed. Information relating to positioning of the magnetic head (hereinafter, referred to as position information) is recorded on concentrical cylinders (or tracks). A head position control unit controls the VCM so as to move the magnetic head to a target cylinder on the basis of this information.

FIG. 2 shows how a moving speed of the magnetic head 14 in FIG. 1 is controlled. A target speed of the magnetic head 14 is determined on the basis of a current position or a time that elapsed since the start of a seek operation. Feedback control is initiated so that the moving speed of the magnetic head matches the target speed.

Specifically, position information recorded on the magnetic disk 20 is read, whereupon a target speed generator 23 generates a target speed corresponding to a remaining distance, the remaining distance being calculated on the basis of a target position to which the magnetic head 14 is to be moved. Further, past position information is retained so that a current speed is determined by a speed generator 24 which compares the past position information with the current position information. A difference between the determined current speed and the target speed is calculated, whereupon a compensator 25 feeds a control current to the VCM by using proportional integral (PI) control on a speed error so that an error in speed is minimized.

For the sake of simplification, it is assumed that the current fed to the VCM is proportional to an acceleration of the magnetic head 14, and the relation $X \propto \iint I dt$ holds, wherein I indicates a current fed to the VCM, and X indicates a distance that the magnetic head 14 moves. On the basis of this relation, the relationship between the position, the speed and the current can be derived.

Approaches for controlling the speed include the Bang Bang control method, a control method wherein acceleration and deceleration curves are rectangular in shape, a method whereby a deceleration curve is triangular in shape, and a method wherein an acceleration curve is determined so as to minimize a differential value of an acceleration.

In a control method in which the acceleration curve has an interval (target speed generation interval) where the Pth (P is a fixed value) power of the position is proportional to the speed, that is, where the relationship $V \propto X^P$ holds, $P=½$ if the acceleration is regular with respect to time, and $P=⅔$ if the acceleration is linearly proportional to time.

Thus, the optimal speed corresponding to the current position read is obtained in accordance with the relationship $V \propto X^P$. since it takes a long time for the MCU to calculate the speed, the relationship between the position and the speed is stored in a reference table in a read-only memory (ROM), and the speed is determined by referring to the table each time when the position is determined.

FIG. 3 shows a reference table used in the speed control illustrated in FIG. 2. As shown in FIG. 3, the $Y=X^P$ curve shows a relationship between a set of reference values X indicating the distance to the target position and corresponding generated values indicating the speed, a predetermined number of reference values X being arranged at equal intervals. The $Y=X^P$ relationship is assumed as a simplified form of the actual proportional relationship. Obviously, the more precisely the target speed is determined, the better. Hence, the number of data items in a table may correspond to, for example, the number of cylinders on a disk. For example, in case there are 1200 cylinders, if it is assumed that the distance corresponding to an average access time is ⅓ of the entire distance that the head can travel, and the distance required for acceleration and deceleration is ½ that of the entire distance that the head travels, the total number of required data items is $$1200 \times (⅓) \times (½) = 200$$

For example, two bytes is needed for a data item in order that the target speed is determined with precision. In that case, the ROM needs a size of 400 bytes.

In an actual operation, the generated values for two reference values corresponding to the position of the magnetic head 14 are obtained from the reference table of FIG. 3, whereupon the target speed is determined by linear interpolation.

However, the capacity required for the ROM to include the table may occupy several percent of the total storage capacity of the MCU (which has a small capacity; for example, 16–64 kilobytes). The number of data items contained in a table decreases if the table is to be accommodated in a small memory area. Conversely, if the number of data items is to be increased, a larger memory area is required, thus making it difficult to make the disk drive compact.

SUMMARY OF THE INVENTION

Accordingly, an object of the present invention is to provide a drive control apparatus which is capable of performing high-precision control and requires reduced memory capacity.

Another and more specific object of the present invention is to provide a drive control apparatus having processing means for effecting speed control, the processing means comprising: target speed generating means for calculating a target speed Y of a driven body such as a magnetic head at a current distance X from a target position according to a relationship $Y=Y_0(X/X_0)^P$, where $X_0$ is a distance from a position at which driving control is started to the target position, $Y_0$ is a maximum speed corresponding to the distance $X_0$, and P is a predetermined coefficient; storing means having a first table which stores values of $(\frac{1}{2}^N)^P$ at different values of $\frac{1}{2}^N$, where N is an integer, and a second table which stores values of $(2^N \cdot X/X_0)^P$ at different values of $2^N \cdot X/X_0$, the target speed generating means determining a value of N so as to place the value of $2^N \cdot X/X_0$ in a predetermined range such that $0.5 < 2^N \cdot X/X_0 \leq 1.0$ and generating the target speed by referring to the first and second tables.

A value of P may be modified depending on a relative position of the driven body with respect to the target position.

The distance $X_0$ may be divided into a plurality of intervals, the value of P may be modified depending on the interval in which the driven body is located, and the maximum speed $Y_0$ in the plurality of intervals may be defined such that $$Y_{02} = Y_{01} \cdot NormTable_1(X2/X1) \cdot (1/2^{N1})^{P1},$$

$$Y_{03} = Y_{02} \cdot NormTable_2(X3/X2) \cdot (1/2^{N2})^{P2},$$

$$\vdots$$

$$Y_{0i} = Y_{0i-1} \cdot NormTable_{i-1}(Xi/Xi-1) \cdot (1/2^{Ni-1})^{Pi-1},$$

where $Y_{01}, Y_{01}, \ldots Y_i$ indicate maximum speeds for first, second, . . . and ith intervals, $X_1, X_2, \ldots X_i$ indicate distances from a head of respective intervals to the target position, $P_1, P_2, \ldots P_{i-1}$ indicate predetermined coefficients defining a relationship between a current position and a target speed in respective intervals, $N_1, N_2, \ldots N_{i-1}$ indicate integers, and $NormTable_1(X2/X1)$, for example, indicates a value $(2^{N1} \cdot X2/X1)^{P1}$ obtained by referring to the second table employed in the first interval, ensuring that the equation $Y=Y_0(X/X_0)^P$ yields the same target speed value at a border of adjacent intervals and enabling a seamless target speed control across the adjacent intervals.

BRIEF DESCRIPTION OF THE DRAWINGS

Other objects and further features of the present invention will be apparent from the following detailed description when read in conjunction with the accompanying drawings, in which:

FIG. 4B illustrates how a coefficient N according to the speed control of the present invention is selected;

DESCRIPTION OF THE PREFERRED EMBODIMENTS

Figure 4A:
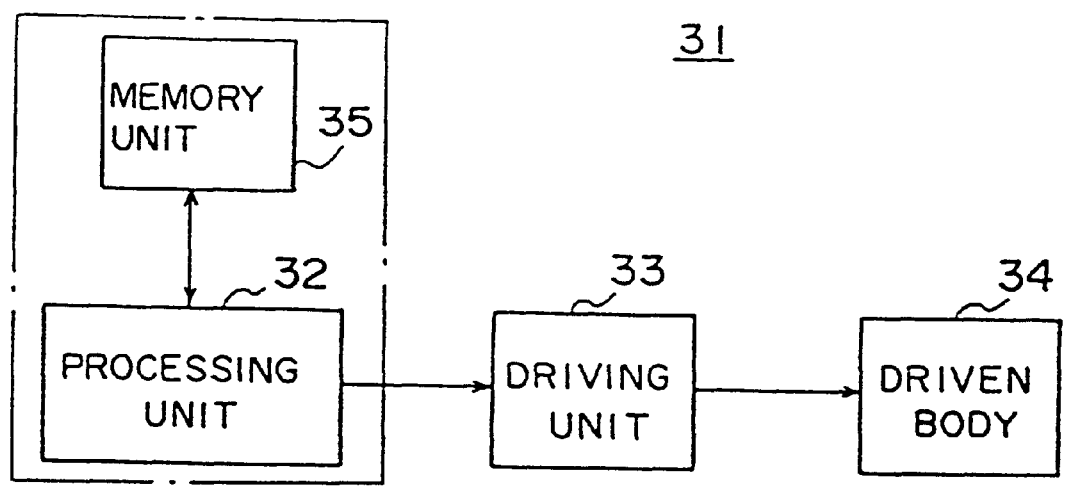
FIG. 4A is a block diagram showing a construction of a drive control apparatus of the present invention.
Figure 4C:
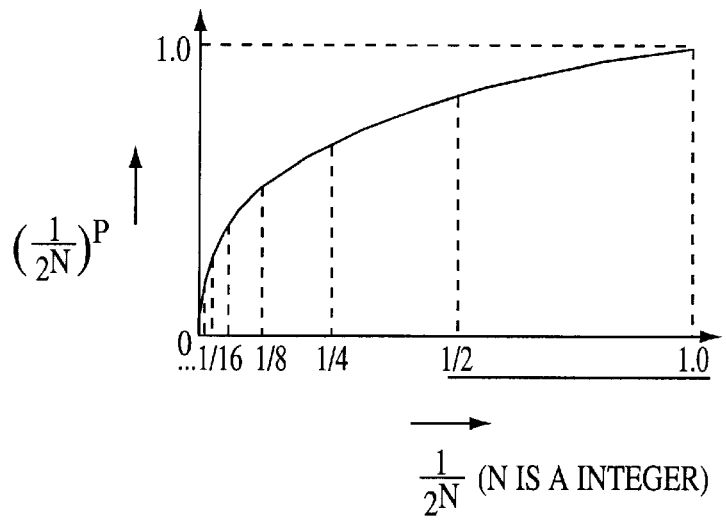
FIG. 4C illustrates a first table according to the present invention and its graphical representation.
Figure 4D:
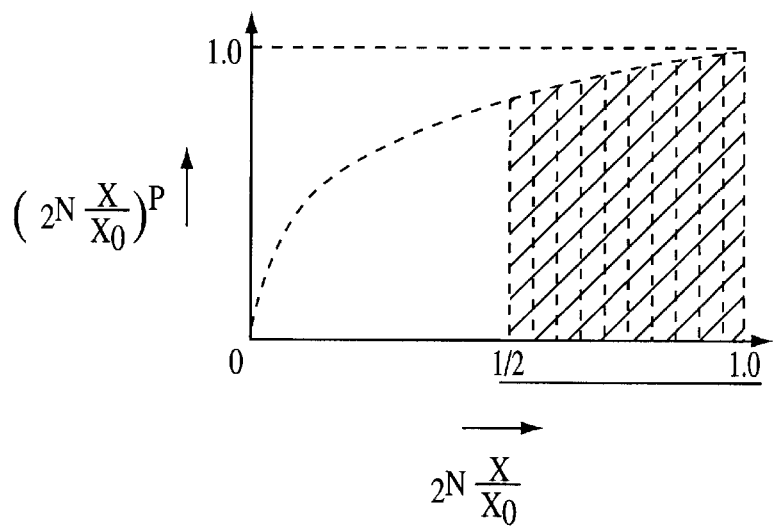
FIG. 4D illustrates a second table according to the present invention and its graphical representation.

FIGS. 4A through 4D show a construction of an embodiment of the present invention. FIG. 4A is a block diagram of a drive control apparatus 31 of the present invention. FIG. 4B illustrates how a coefficient N according to the speed control of the present invention is selected. FIG. 4C illustrates a first table according to the present invention and its graphical representation. FIG. 4D illustrates a second table according to the present invention and its graphical representation.

The drive control apparatus 31 shown in FIG. 4A is constructed such that a driving unit 33 moves a driven body 34 to a target position in accordance with a control signal, the control signal being provided by a processing unit 32 (processing means). The processing unit 32 has a speed generating means for calculating a speed, a memory unit 35 (storing means) embodied by a ROM or the like. The memory unit 35 contains the first table illustrated in FIG. 4C and the second table illustrated in FIG. 4D.

We will now see the background for the speed control using first and second tables. Assuming that a distance from a current position of the driven body 34 to the target position is X and an optimal speed that corresponds to the current position is Y, the relationship $Y=K \cdot X^P$ holds.

In the speed control of the present invention, a current distance value X indicating the distance from the current head position to the target position is divided by a predetermined reference distance value $X_0$ that indicates a distance from a position at which the driving control is started to a target position, so that a relative distance value (hereinafter, referred to as a normalized distance value) $X/X_0$ that ranges between 0.0 and 1.0 is obtained.

Assuming that a maximum speed corresponding to the distance $X_0$ is $Y_0$, the relationship $Y_0=K \cdot X_0^P$ holds.

Converting the relationship $Y=X \cdot X^P$, we obtain $$Y = K \cdot (X_0 \cdot X / X_0)^P \quad (1)$$
$$= K \cdot X_0^P \cdot (X / X_0)^P$$

Substituting the relationship $Y_0 = K \cdot X_0^P$ into the right side of the equation (1), $$Y = Y_0 (X/X_0)^P \quad (2)$$

Converting this, $$Y = Y_0 (X/X_0)^P = Y_0 (\tfrac{1}{2}^N)^P (2^N \cdot X/X_0)^P \quad (3)$$

N is an integer which is selected each time the target speed is to be calculated so that the relationship $(\tfrac{1}{2}^{N+1}) < (X/X_0) \leq (\tfrac{1}{2}^N)$ holds when there is a relationship $0.0 < (X/X_0) \leq 1.0$. Assuming that $$r = 2^N (X/X_0) \quad (4)$$

it is to be noted that $\tfrac{1}{2} < r \leq 1.0$.

The equation (3) shows that the target speed Y can be determined if the following means are provided:

a) means for determining the value of N;
b) means for determining $(2^N \cdot X/X_0)^P$ by referring to, for example, a table;
c) means for determining $(\tfrac{1}{2}^N)^P$ by referring to, for example, a table; and
d) means for executing the calculation of the equation (3).

The value $Y_0$ corresponding to the value $X_0$ is preset. As shown in FIG. 4C, the values of $(\tfrac{1}{2}^N)^P$ are stored in the first table in the memory 35. As shown in FIG. 4D, the values of r, which vary in the range 0.5–1.0, are stored in the second table.

More specifically, the first table stores discrete values $\tfrac{1}{2}^N$ (... $\tfrac{1}{16}$, $\tfrac{1}{8}$, $\tfrac{1}{4}$, $\tfrac{1}{2}$ and 1) and Pth powers thereof. The second table stores $2^{N \cdot X/X_0}$ values provided at uniform intervals and Pth powers thereof.

FIG. 4B illustrates how a coefficient N according to the speed control of the present invention is selected. In FIG. 4B, it is assumed that $X_0$ is equal to 256. It will be learned that the normalized distance value $X/X_0$ ranges between 0 and 1 and the coefficient N can be selected so that $2^N * X/X_0$ ranges between 0.5 and 1. FIG. 4B shows that by selecting the coefficient N appropriately, it is not necessary to store the one-to-one correspondence between the distance (or the normalized distance) and the target speed.

A description will now be given of how the tables of the present invention are used.

When the normalized distance value $X/X_0$ is within the range $\tfrac{1}{2}$–1.0, the coefficient N is not called for. In other words, N=0. The second table is referred to obtain the $(X/X_0)^P$ value. A target speed is then obtained by substituting the $(X/X_0)^P$ value into the equation (2).

When the normalized distance value is smaller than 0.5 or greater than 1.0, appropriate selection of the coefficient N is called for in order to generate a target speed of the driven body 34 corresponding to a distance to the target position. For example, when the target speed Y is to be obtained for the normalized distance value $X/X_0$ of $\tfrac{1}{3}$ ($\tfrac{1}{4} < \tfrac{1}{3} \leq \tfrac{1}{2}$), $\tfrac{1}{3}$, the coefficient N=1 is selected so that $\tfrac{1}{3}$ is doubled to $\tfrac{2}{3}$. As a result, the normalized distance value falls in the range $\tfrac{1}{2}$–1.0, whereupon the first and second tables are referred to and the values specified by the tables are substituted into the equation (3). In this way, the target speed is calculated.

It will be appreciated that the second table do not have to span the entire range 0.0–1.0 of the normalized distance values $X/X_0$. Since the present invention includes a step for appropriately selecting the coefficient N each time a target speed is to be determined, the second table has only to cover the normalized distance value range of $\tfrac{1}{2}$–1.0.

With this arrangement, it is possible to reduce the size of the memory area significantly. For example, the size of the memory area required in the present invention is $\tfrac{1}{2}$–$\tfrac{1}{10}$ of that of the conventional technology. Specifically, if the table is to provide a total of 210 entries, the second table requires 34 bytes (17 words) to store the values $(16/32)^P$, $(17/32)^P$ ... $(32/32)^P$, and the first table requires 22 bytes (11 words) to store the $(\tfrac{1}{2}^N)^P$ values $((\tfrac{1}{2}^0)^P, (\tfrac{1}{2}^1)^P \ldots (\tfrac{1}{2}^{10})^P)$.

A description will now be given of a case where the reference distance is switched. For example, the driven body 34 may be driven such that a distance to the target position becomes smaller than a predetermined distance $X_1$. $X_1$ should satisfy the equation below that derives from the relationship $Y=X^P$.

$$Y_1 = Y_0 (X_1/X_0)^P \quad (5)$$

where $Y_0$ is a maximum speed that corresponds to the distance $X_0$, and $Y_1$, is a target speed at the distance $X_1$. It may be required that $X_1$ instead of $X_0$ is to be used as the reference distance, that is, a switching of the reference distance may be required, when $X<X_1$. The target speed is then obtained as per $$Y = Y_1 (X/X_1)^P \quad (6)$$

The equation above can be modified as follows.

$$Y = Y_1 (X/X_1)^P = (Y_0 (X_1/X_0)^P)(X/X_1)^P$$
$$= Y_0 (X/X_0)^P$$

The above result is the same as when $X_0$ is used as the reference distance. Thus, it is ensured that same curve can be used to determine the target speed even if the reference distance is changed. This means that, only by initially specifying the relationship between $X_0$ and $Y_0$ as the reference, the target speed value corresponding to an arbitrary reference distance can be properly calculated. The first table can be used "repeatedly" for different reference distances. The $X^P$ curve is used repeatedly as the coefficient N is appropriately selected to calculate the target speed.

Figure 3:
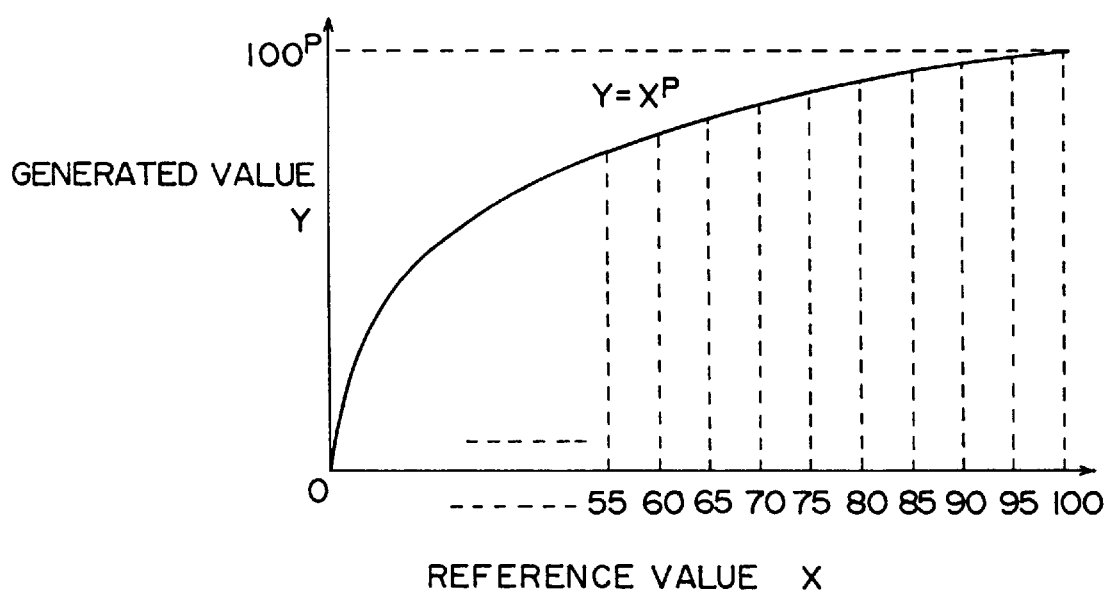
FIG. 3 shows a reference table used in the speed control of FIG. 2.

If the conventional reference table (FIG. 3) is used to effect the calculation $Y=X^P$, the table is referred to each time when an calculation is conducted in order to retrieve the value Y for each of the values X. In the conventional reference table, the values X may be stored at uniform intervals of, for example, 1.

In contrast, the tables of the present invention are not consulted at uniform distances throughout the operation.

While the current distance value X is close to the reference distance value $X_0$ (=256, for example), N=0 is selected. Assuming that the second table has 32 entries, the second table in this case stores entries of $(2^N \cdot X/X_0)^P$ at intervals of 8 (=256/32).

As the head travels until the current distance value X is 128, N=1 is selected so as to place the value of $2^N \cdot X/X_0$ in the range 0.5–1. In this case, the second table stores entries at intervals of 4 (=128/32), providing a finer division of the distance than at the start of the travel of the head. FIG. 4B shows that different values of N are selected at the current distance values of 1, 2, 4, 8, 16, 32, 64, 128 and 256. Stated otherwise, different values of $(\frac{1}{2}^N)^P$ are employed in the calculation of the target speed at the current distance values of 1, 2, 4, 16, 32, 64, 128 and 256.

It will be appreciated that the present invention yields a significantly smaller computation error than the conventional approach, when $X_0$ is small. That is, the present invention provides high-precision computations of the target speed as the head approaches the target. Our experiment has confirmed that the present invention also ensures that only a negligible level of computation error exists even in the bulky division such as the division of the distance range 0–256 into 32 discrete values.

Figure 1:
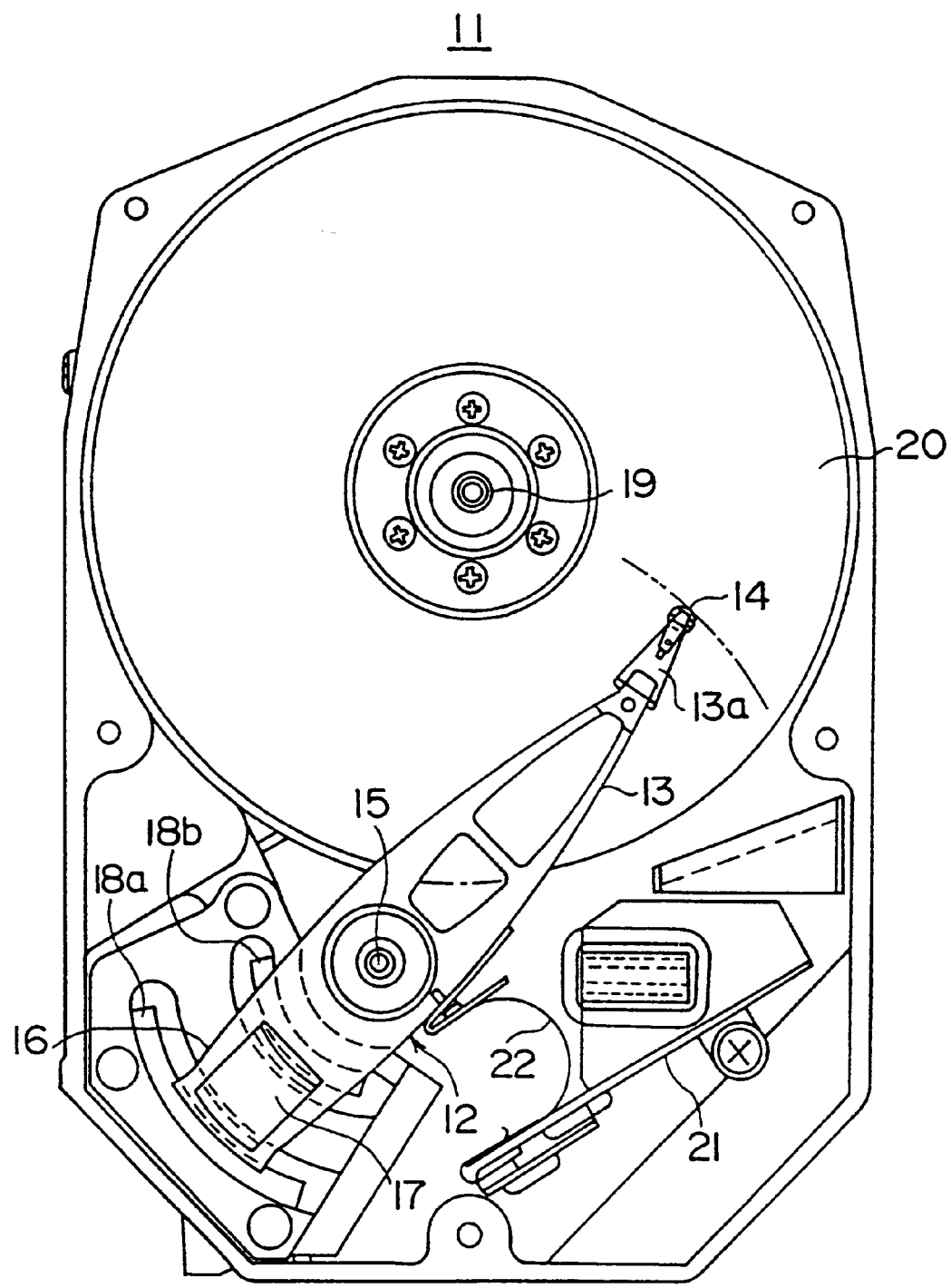
FIG. 1 is a top view of an example of a conventional magnetic disk drive.
Figure 2:
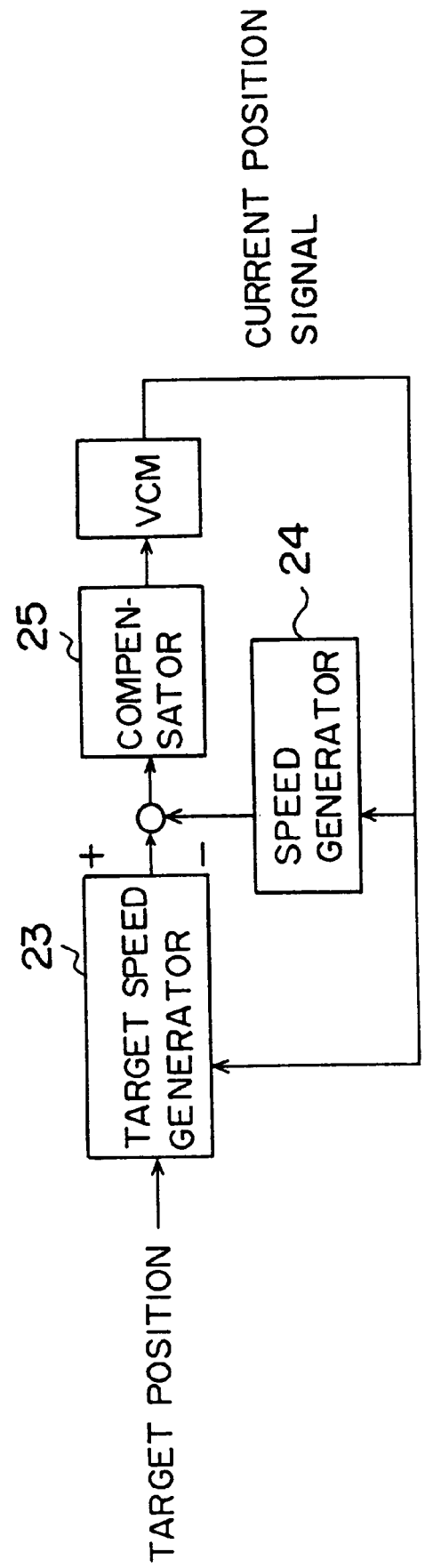
FIG. 2 is a block diagram of speed control.
Figure 5:
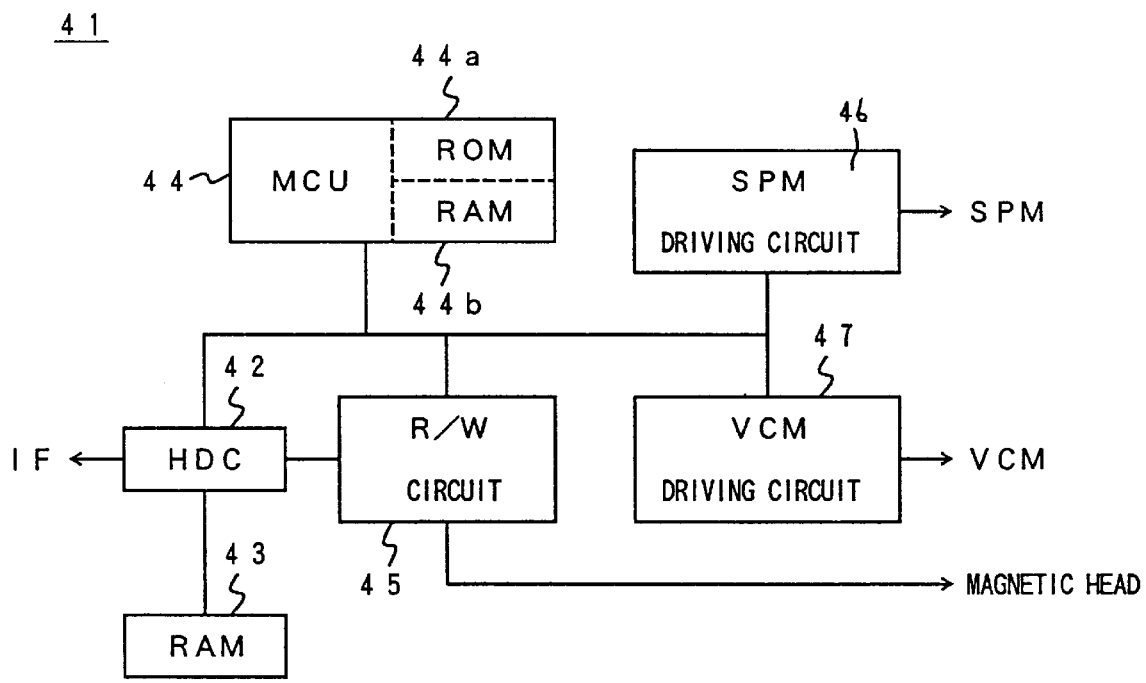
FIG. 5 is a block diagram of a construction of an application of the present invention.

FIG. 5 shows a construction of an application of the present invention to a magnetic disk drive 41. FIG. 5 is a block diagram of speed control whereby the position of a magnetic head with respect to a magnetic disk is controlled, the mechanical construction being the same as the construction of FIG. 1. The speed control loop is the same as that of FIG. 2.

Referring to FIG. 5, the magnetic disk drive 41 has a hard disk controller (HDC) 42 connected to a host computer via an interface circuit IF. The hard disk controller 42 has a RAM 43, and controls a MCU (processing unit) 44, a read/write (R/W) circuit 45 for sending and receiving information to be written and read from a magnetic disk, an SPM driving circuit 46 for driving a spindle motor (SPM) for rotating the magnetic disk at a constant pressure, a VCM driving circuit 47 for driving the VCM for moving the magnetic head (driven body). The MCU 44 has a ROM 44a which stores the aforementioned first table and a RAM 44b which stores the aforementioned second table, the ROMs 44a and 44b constituting a memory unit. In case a maximum target speed VobjMax or an acceleration dv is assumed to be proportional to the power of seek distance, normalized tables characterized by a curve similar to the one discussed above may be stored in the memory unit.

In the magnetic disk 41, a target speed is generated by reading the position information (servo marks read by the magnetic head from the magnetic disk) of the magnetic head into the MCU 44. The VCM driving circuit 47 controls the VCM so that a target position is sought.

Figure 6:
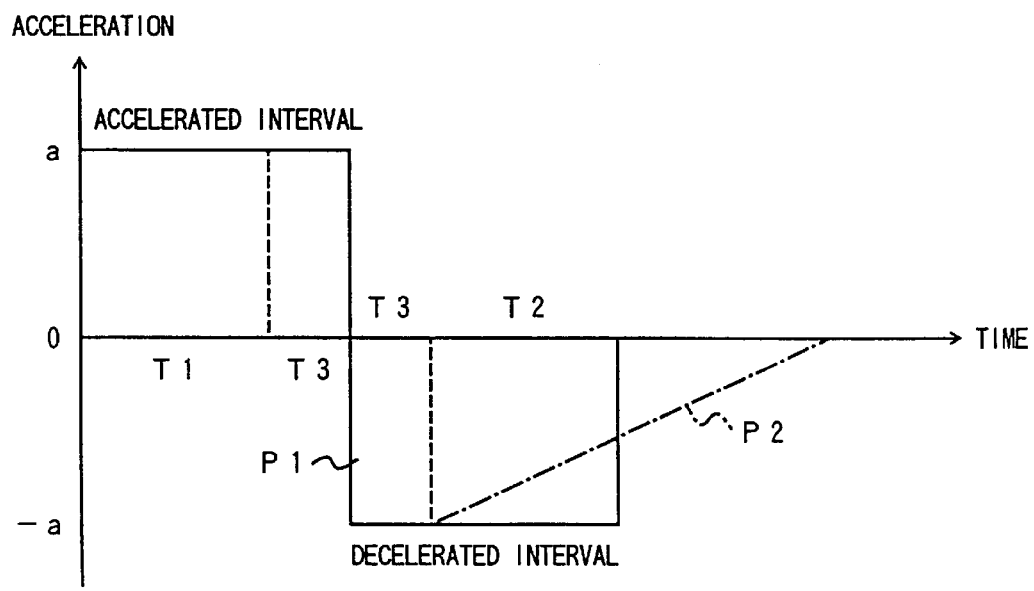
FIG. 6 is a graph showing the speed control of FIG. 5.

FIG. 6 is a graph which explains the speed control of FIG. 5. FIG. 6 shows a waveform of a current supplied to the VCM. The waveform has an accelerated interval T1, a constant-speed interval (constant deceleration interval) T3 and a deceleration interval T2, the acceleration ranging between −a and +a. The target speed curve, where the maximum target speed is VobjMax, is designed so that the target speed is proportional to the power of the value indicating the position of the magnetic head, similarly to the case of FIG. 4B. The target speed is calculated in accordance with a relationship in which the speed is proportional to the integral value derived from the current value, and a distance traveled (position) is proportional to the double integral value derived from the current value.

Figure 7:
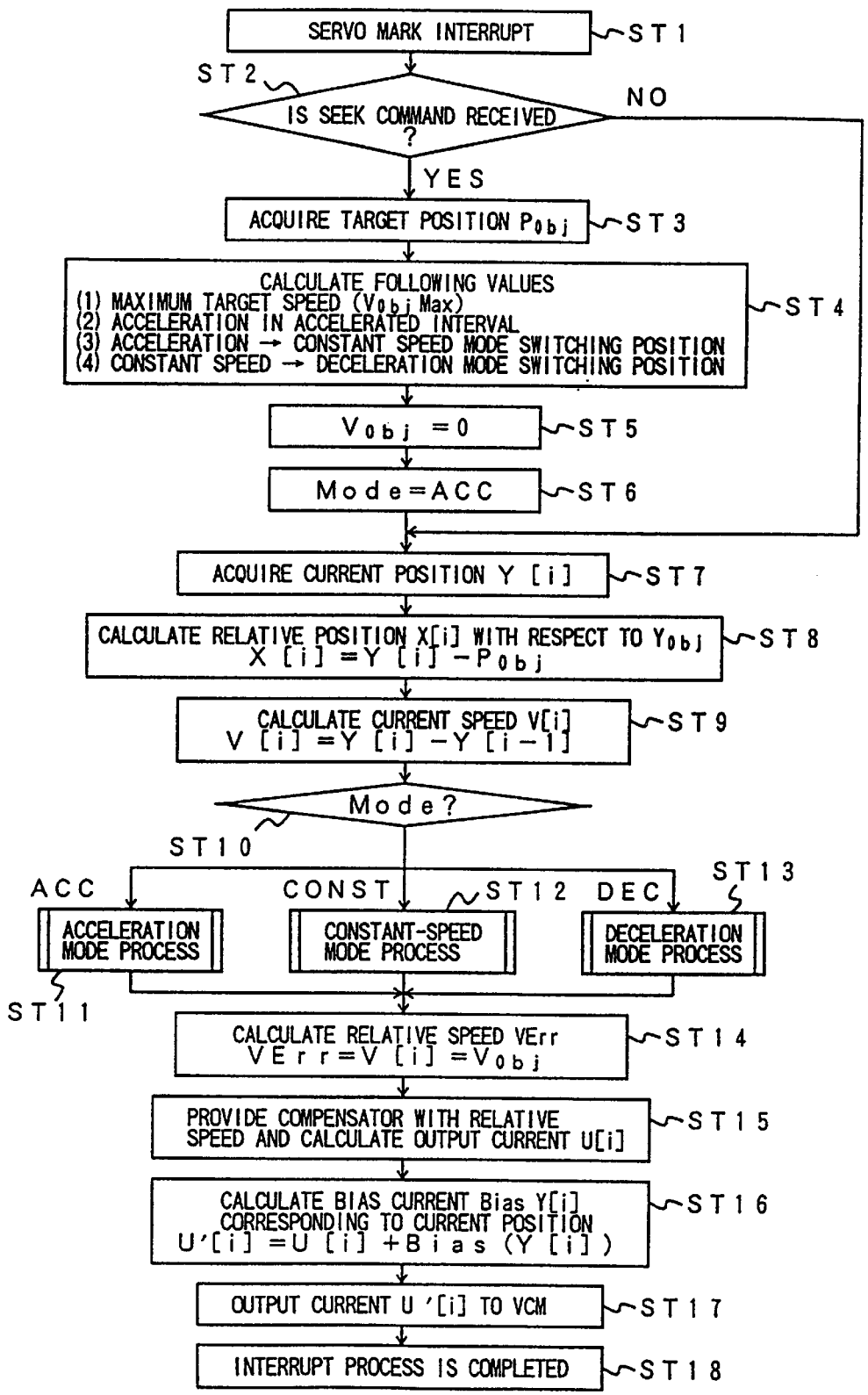
FIG. 7 is a flowchart showing processes carried out in the speed control of FIG. 5.

FIG. 7 is a flowchart showing processes carried out in the speed control of FIG. 5. When a servo mark interrupt is input (ST1), a determination is made as to whether or not a seek command is received (ST2). When a seek command is received, a target position Pobj is acquired (ST3), whereupon a maximum target speed VobjMax, an acceleration in the accelerated interval, an acceleration mode→constant speed mode switching position, and a constant speed mode→deceleration mode switching position are calculated (ST4).

When Vobj=0, that is, when the magnetic head is stationary (ST5), a control using the accelerated interval is initiated (ST6). Thereupon, the position Y[i] of the magnetic head is acquired (ST7). When it is determined in ST2 that the seek command is not received, the magnetic head is on the magnetic disk rotated at a constant speed. In this case the current position Y[i] is acquired by reading the servo information (ST7).

Subsequently, a relative position X[i] with respect to the target position Pobj is calculated (X[i]=Y[i]−Pobj) (ST8) so as to determine a distance over which the magnetic head is to be moved. Thereupon, a current speed is calculated (V[i]=Y[i]−Y[i−1]) (ST9).

A determination is then made as to the mode to be initiated (ST10). The modes include an acceleration process (ST11, described with reference to FIG. 8), a constant-speed mode process (ST12, described with reference to FIG. 9) and a deceleration mode process (ST13, described with reference to FIG. 10). When a mode process is completed, a relative speed VErr is calculated (VErr=V[i]−Vobj) (ST14) so as to obtain a difference between the current speed and the target speed. The relative speed is then fed to the compensator (see FIG. 2), and an output current U[i] is calculated (ST15).

Subsequently, a bias current Bias(Y[i]) corresponding to the current position Y[i] is calculated (U'[i]=U[i]+Bias(Y[i])) (ST16), a current U'[i] is output to the VCM (ST17), and the interrupt process is terminated (ST18). In addition to the VCM interrupt process, the servo mark interrupt process also includes SPM rotation control, measurement of a control system (calibration) and the like. These processes are executed after the VCM interrupt process is completed.

Figure 8:
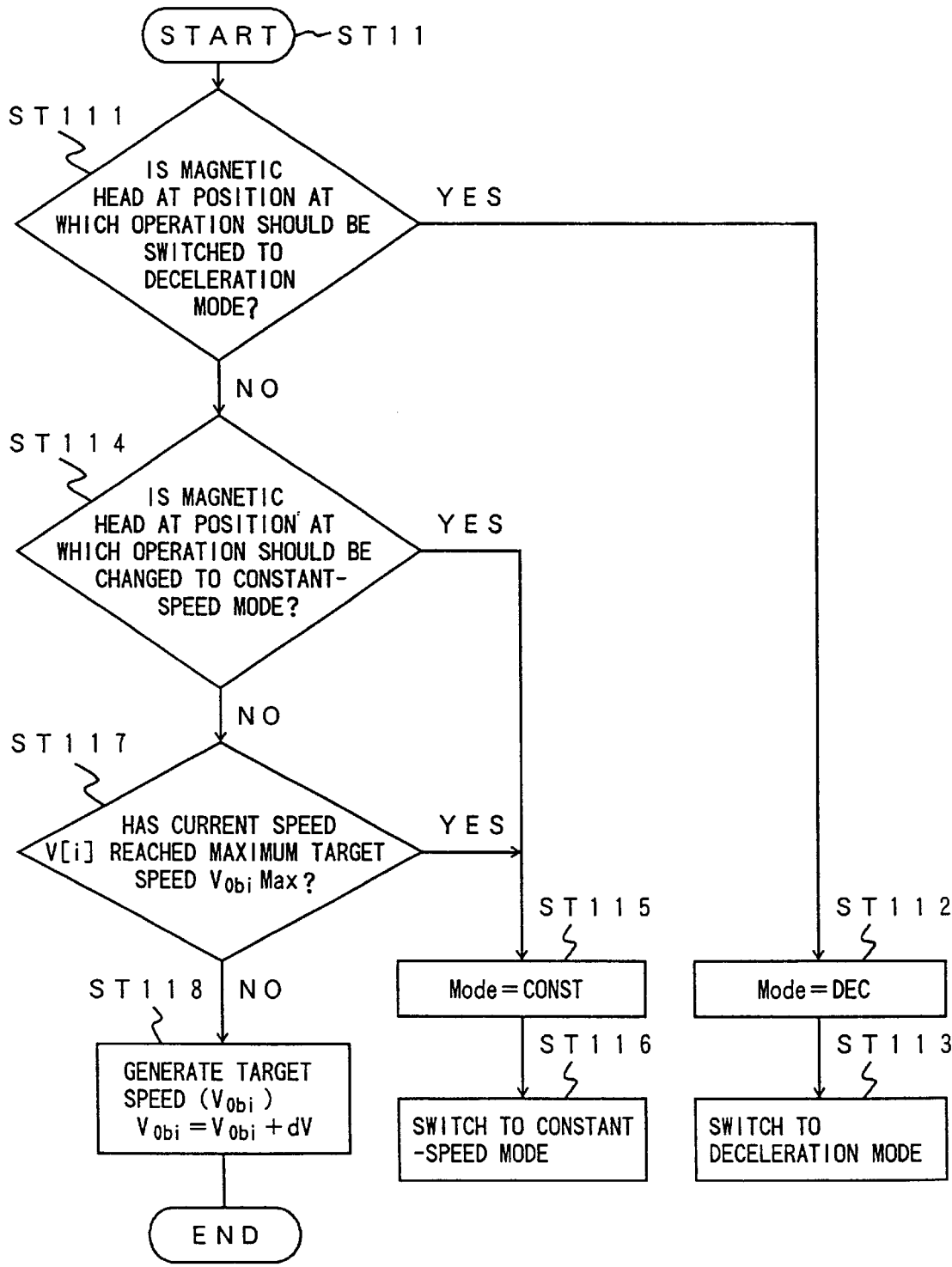
FIG. 8 is a flowchart showing an acceleration mode process of FIG. 7.

FIG. 8 is a flowchart showing the acceleration mode process of FIG. 7. In the acceleration mode process (T1 period in FIG. 6) of FIG. 7, a determination is made as to whether or not the magnetic head is at a position at which the operation should be switched to the deceleration mode (ST111). If the answer in ST111 is affirmative, the deceleration mode is set (Mode=DEC) (ST112), and the operation is switched to deceleration mode (ST113).

When it is determined that the magnetic head is not at a position at which the operation should be switched to the deceleration made, a determination is made as to whether or not the magnetic head is at a position at which the operation should be switched to the constant-speed mode (ST114). When the answer in ST114 is affirmative, the constant-speed mode is set (Mode=CONST) (ST115), and the operation is switched to the constant-speed mode (ST116).

When the answer in ST114 is affirmative, a determination is made as to whether or not the current speed V[i] has reached the maximum target speed VobjMax (ST117). When the answer in ST117 is affirmative, the constant-speed mode is set (ST115), and the operation is switched to the constant-speed mode (ST115). When the answer in ST117 is negative, the target speed Vobj is generated as per $$Vobj_o = Vobj + dv \qquad (7) \text{ (ST118)}.$$

Figure 9:
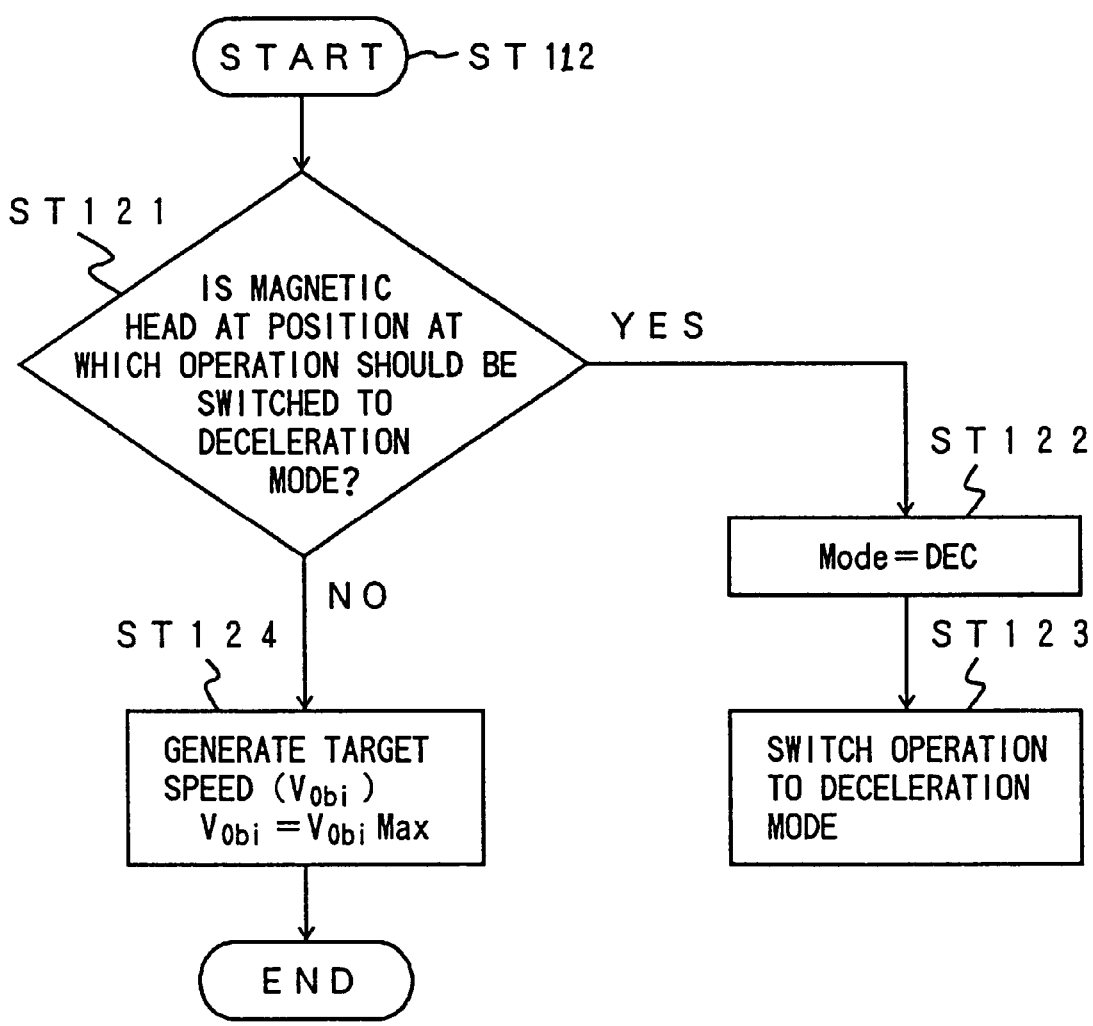
FIG. 9 is a flowchart showing a constant-speed mode process of FIG. 7.

FIG. 9 is a flowchart showing the constant-speed mode process of FIG. 7. In the constant-speed mode process of ST112 of FIG. 7, or in ST116 of FIG. 8 wherein the operation is switched to the constant-speed mode (T3 period of FIG. 6), a determination is first made as to whether or not the magnetic head is at a position at which the operation should be switched to the deceleration mode (ST121). If the answer in ST121 is affirmative, the deceleration mode is set (Mode=DEC) (ST122), and the operation is switched to the deceleration mode (ST123).

If the answer in ST121 is negative, the target speed Vobj is set to be the maximum target speed (Vobj=VobjMax) (ST124).

Figure 10:
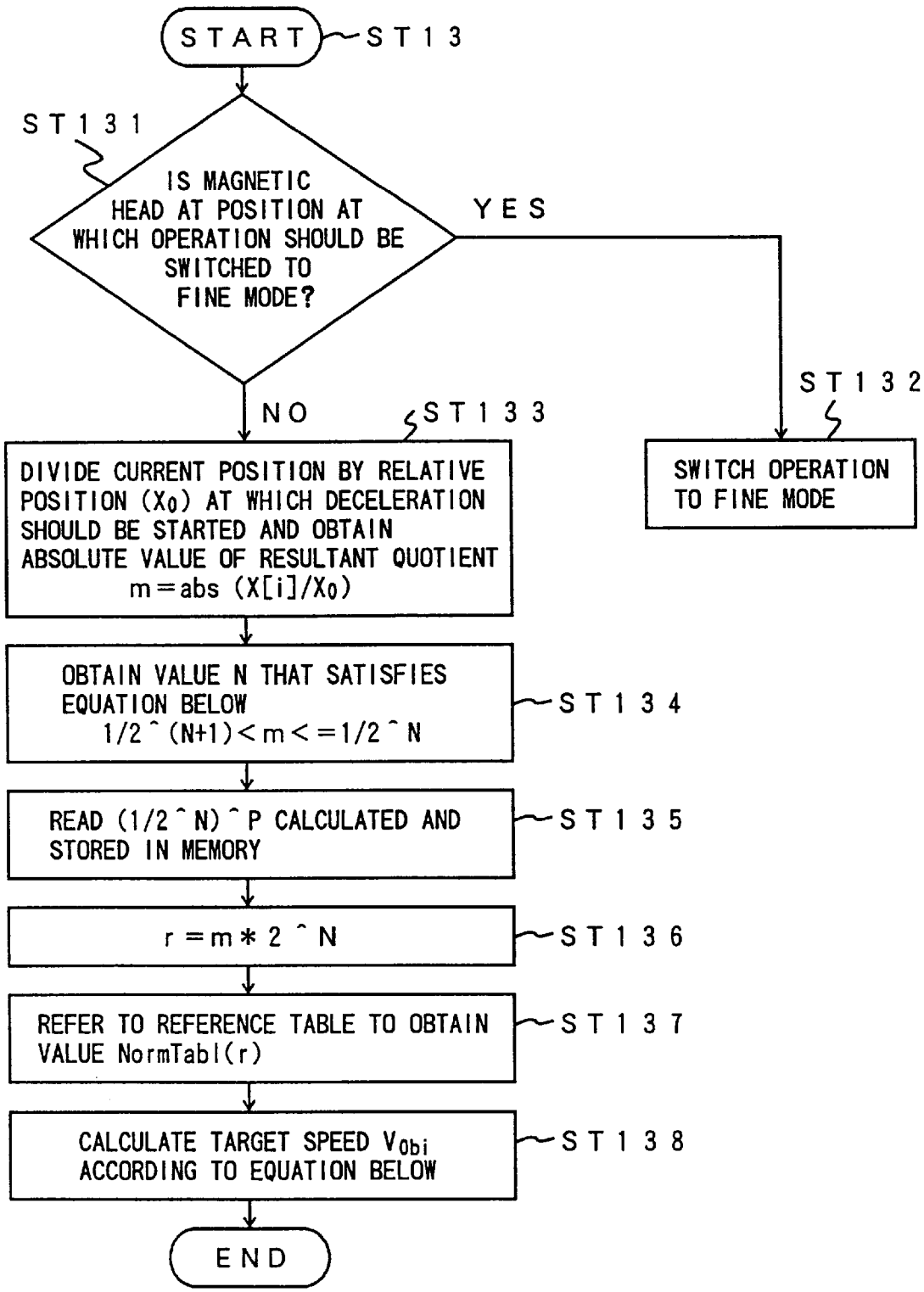
FIG. 10 is flowchart showing a deceleration mode process of FIG. 7.

FIG. 10 is a flowchart of the deceleration process of FIG. 7. It is assumed that the ROM 44a of the MCU 44 stores $(\frac{1}{2}^N)^P$ (hereinafter, an exponent is indicated by the symbol ^ to the right thereof. For example, $(\frac{1}{2}^N)^P$ will be $(\frac{1}{2}^\wedge N)^\wedge P$). The ROM 44a also stores the normalized table for determining the speed as per $V=X^{\wedge P}$ ($0.5 \leq X \leq 1.0$). In the deceleration mode process (T2 period of FIG. 6) in ST13 of FIG. 7, a determination is made as to whether or not the magnetic head is at a position at which the operation should be switched to a FINE mode (ST131). If the answer in ST131 is affirmative, the operation is switched to the FINE mode (ST132). A FINE mode is control of the position of the magnetic head near a target track.

When the answer in ST131 is negative, the current relative position is divided by a relative position $X_0$ at which the deceleration should be started, and an absolute value (m=abs $(X[i]/X_n)$) of the quotient is obtained (ST133). The value of N which satisfies an inequity $\frac{1}{2}^\wedge(N+1) \leq m \leq \frac{1}{2}^\wedge N$ is obtained (ST134), and the corresponding value $(\frac{1}{2}^\wedge N)^{\wedge P}$ stored in the ROM 44a is read (ST135). The remaining distance to the target r (r=m·2^N) is then obtained (ST136). Using r, the normalized table is referred to, whereupon the value NormTable(r) is obtained by linear interpolation (ST137).

The target speed Vobj is given by the equation below (ST138).

$$Vobj = VobjMax \times NormTable(r) \times (\frac{1}{2}^\wedge N)^{\wedge P} \quad (8)$$

That is, since VobjMax is preset as described above and the value $(\frac{1}{2}^\wedge N)^{\wedge P}$ and the normalized table are stored in the ROMs 44a and 44b, respectively, the target speed Vobj can be easily obtained by the equation (8).

P has a value dependent on the deceleration curve, P being equal to ½ for the constant acceleration (see FIG. 6) and ⅔ when the acceleration curve exhibits a triangular form. For example, in case the acceleration curve exhibits a triangular form, the relationship between a remaining distance X from a position at which the magnetic head starts to be decelerated at an acceleration −a to a position at which the speed becomes zero, and the target speed Vobj is given by $$Vobj = (9a/2)^\wedge (\frac{1}{3}) \cdot X^\wedge (\frac{2}{3}) \quad (9)$$

Thus, Vobj is proportional to the ⅔th power of X. Accordingly, the target speed is obtained by calculating the ⅔th power of the remaining distance to the target position.

While the current speed is calculated from a positional difference in ST9 of FIG. 10, the positional difference may be allowed to pass through a low-pass filter. Alternatively, the current speed may be calculated by an observer (status observing apparatus). In this way, the effect of noise in the high-frequency range can be prevented. For example, using the observer, $$\begin{pmatrix} X_{i+1} \\ V_{i+1} \end{pmatrix} = \begin{pmatrix} 1 & T \\ 0 & 1 \end{pmatrix} \begin{pmatrix} X_i \\ V_i \end{pmatrix} + \frac{B_L}{m} \begin{pmatrix} T^2/2 \\ T \end{pmatrix} U_i + \begin{pmatrix} L_1 \\ L_2 \end{pmatrix} (Y_i - X_i) \quad (10)$$

wherein T indicates a sampling period, $B_L$ indicates a magnetic flux density in a current $U_i$ supplied to the VCM coil, m indicates a mass of the actuator, and $L_1$ and $L_2$ indicate magnetic head observation positions and serves as a basis (output of the observer) for calculating the speed.

In the above-described VCM control, the target VCM speed proportional to the power of the remaining distance is calculated. Alternatively, the remaining distance may be divided into intervals so that the target speed V is approximated by the power of the remaining distance X.

For example, as indicated by a dashed line in FIG. 6, the target curve may be configured such that the speed is proportional to the ½th power (P1 or P3) of the distance in the first interval of the remaining distance, and to the ⅔th power (P2) in the next interval. Specifically, the target speed in the first interval is given by $$Vobj = VobjMax1 \cdot NormTable(X/X1) \cdot (\frac{1}{2}^{N1})^{P1} \quad (11)$$

$$\frac{1}{2}^\wedge(N1+1) < X/X1 \leq \frac{1}{2}^\wedge N1$$

The target speed in the second interval is given by $$Vobj = VobjMax2 \cdot NormTable(X/X2) \cdot (\frac{1}{2}^{N2})^{P2} \quad (12)$$

$$\frac{1}{2}^\wedge(N2+1) < X/X2 \leq \frac{1}{2}^\wedge N2$$

The target speed in the third interval is given by $$Vobj = VobjMax3 \cdot NormTable(X/X3) \cdot (\frac{1}{2}^{N3})^{P3} \quad (13)$$

$$\frac{1}{2}^\wedge(N3+1) < X/X2 \leq \frac{1}{2}^\wedge N3$$

Occurrence of gaps in speeds between the intervals is prevented by calculating the maximum target speed as per $$VobjMax2 = VobjMax1 \cdot NormTable(X2/X1) \cdot (\frac{1}{2}^{N1})^{P1} \quad (14)$$

$$VobjMax3 = VobjMax2 \cdot NormTable(X3/X2) \cdot (\frac{1}{2}^{N2})^{P2} \quad (15)$$

A description will now be given of another application of the present invention. In this application, the rotational speed of a DC motor is controlled. The DC motor may be used as an SPM for rotating a magnetic disk or used in a driving system of a robot. In this case, the transfer function is K/(s+a). Therefore, by setting the condition a=0, that is, by setting the transfer function to K/s, the target rotational speed is given as being proportional to the integral value.

In the above described VCM speed control, the target speed is configured to be proportional to the value K/s. Hence, the speed of the DC motor can be controlled similarly by carrying out position detection in the DC motor.

The present invention is not limited to the above described embodiments, and variations and modifications may be made without departing from the scope of the present invention.

What is claimed is:

1. A drive control apparatus having processing means for effecting speed control,
    said processing means comprising:
        target speed generating means for calculating a target speed Y of a driven body at a current distance X from a target position according to a relationship $Y = Y_0 (\frac{1}{2}^N)^P (2^N \cdot X/X_0)^P$, where $X_0$ is a distance from a position at which driving control is started to the target position, $Y_0$ is a maximum speed corresponding to the distance $X_0$, P is a predetermined coefficient, and N is an integer;
        storing means having a first table which stores values of $(\frac{1}{2}^N)^P$ at different values of $\frac{1}{2}^N$, and a second table which stores values of $(2^N \cdot X/X_0)^P$ at different values of $2^N \cdot X/X_0$,
        said target speed generating means determining a value of N so as to place the value of $2^N \cdot X/X_0$ in a predetermined range such that $0.5 < 2^N \cdot X/X_0 \leq 1.0$ and generating the target speed Y based on a value of $(\frac{1}{2}^N)^P$ read from said first table and a value of $(2^N \cdot X/Xo)^P$ read from said second table; and
        control signal means for supplying a control signal indicating said generated target speed to a driving unit of a storage device, whereby said driving unit drives said driven body.

2. The drive control apparatus as claimed in claim 1, wherein a value of P is modified depending on a relative position of the driven body with respect to the target position.

3. The drive control apparatus as claimed in claim 1, wherein the distance $X_0$ is divided into a plurality of intervals, the value of P is modified depending on the interval in which the driven body is located, and the maximum speed $Y_0$ in said plurality of intervals is defined such that $$Y_{02} = Y_{01} \cdot NormTable_1(X2/X1) \cdot (1/2^{N1})^{P1},$$

$$Y_{03} = Y_{02} \cdot NormTable_2(X3/X2) \cdot (1/2^{N2})^{P2},$$

$$\vdots$$

$$Y_{0i} = Y_{0i-1} \cdot NormTable_{i-1}(Xi/Xi-1) \cdot (1/2^{Ni-1})^{Pi-1},$$

where $Y_{01}, Y_{01}, \ldots Y_i$ indicate maximum speeds for first, second, . . . and ith intervals, $X_1, X_2, \ldots X_i$ indicate distances from a head of respective intervals to the target position, $P_1, P_2, \ldots P_{i-1}$, indicate predetermined coefficients defining a relationship between a current position and a target speed in respective intervals, N1, N2, . . . N−1 indicate integers, and $NormTable_1(X2/X1)$, for example, indicates a value $(2^{N1} \cdot X2/X1)^{P1}$ obtained by referring to said second table employed in the first interval, ensuring that the equation $Y=Y_0(X/X_0)^P$ yields the same target speed value at a border of adjacent intervals and enabling a seamless target speed control across the adjacent intervals.

\* \* \* \* \*

UNITED STATES PATENT AND TRADEMARK OFFICE
CERTIFICATE OF CORRECTION

PATENT NO. : 6,084,742
DATED : July 4, 2000
INVENTOR(S) : Takaishi et al.

It is certified that error appears in the above-indentified patent and that said Letters Patent is hereby corrected as shown below:

Column 12, line 6, please delete "N-1" and insert --Ni-1-- therefor.

Signed and Sealed this

First Day of May, 2001

Attest:

NICHOLAS P. GODICI

Attesting Officer        Acting Director of the United States Patent and Trademark Office